(12) United States Patent
Sorsa et al.

(10) Patent No.: US 6,262,552 B1
(45) Date of Patent: Jul. 17, 2001

(54) METHOD OF POSITIONING AN ACTUATOR

(75) Inventors: Jukka Sorsa; Juha Sanaksenaho, both of Tampere; Kimmo Saunisto, Jyskä, all of (FI)

(73) Assignee: Metso Paper Automation Inc., Tampere (FI)

( * ) Notice: Subject to any disclaimer, the term of this patent is extended or adjusted under 35 U.S.C. 154(b) by 0 days.

(21) Appl. No.: 09/233,545

(22) Filed: Jan. 20, 1999

(30) Foreign Application Priority Data

Jan. 23, 1998 (FI) .......................................... 980151

(51) Int. Cl.⁷ .................................................... G05B 11/18
(52) U.S. Cl. ............................ 318/594; 318/561; 318/468
(58) Field of Search ..................................... 318/466–469, 318/446, 447, 590–594, 600, 569, 561

(56) References Cited

U.S. PATENT DOCUMENTS

| | | | |
|---|---|---|---|
| 3,749,996 | 7/1973 | Pomella et al. | 318/571 |
| 3,981,767 | 9/1976 | Al-Shaikh | 162/198 |
| 4,305,029 | 12/1981 | Takahashi | 318/603 |
| 4,353,019 | 10/1982 | Sweeney, Jr. | 318/594 |
| 4,571,530 * | 2/1986 | Sweeney et al. | 318/594 |
| 4,591,774 | 5/1986 | Ferris et al. | 318/696 |
| 4,922,175 * | 5/1990 | Sugiura et al. | 318/592 |

FOREIGN PATENT DOCUMENTS

| | | |
|---|---|---|
| 2518363 | 11/1976 | (DE) . |
| 2601332 | 7/1977 | (DE) . |
| 4103422 | 8/1992 | (DE) . |
| 0076965 | 4/1983 | (EP) . |
| 0263912 | 4/1988 | (EP) . |
| 0786710 | 7/1997 | (EP) . |
| 85731 | 12/1990 | (FI) . |
| 1423706 | 2/1976 | (GB) . |

* cited by examiner

*Primary Examiner*—David Martin
(74) *Attorney, Agent, or Firm*—Ladas & Parry

(57) ABSTRACT

The invention relates to a method for positioning an actuator. In the method, the actuator is controlled by a continuous control pulse (2a) toward a desired value (1), and the position of the actuator is measured. Further, a pulsing range limit located before the desired value (1) is defined, and when the position of the actuator is past the pulsing range limit (3), the motion of the actuator is stopped. The pulsing range limit (3) is defined to be so far from the desired value (1) that the actuator stops before its position is substantially past the desired value (1). The position of the actuator is then measured, and if necessary, a corrective run is performed.

9 Claims, 1 Drawing Sheet

METHOD OF POSITIONING AN ACTUATOR

BACKGROUND OF THE INVENTION

The invention relates to a method of positioning an actuator, in which method motion of the actuator toward a desired value, i.e. is controlled by a continuous control pulse. The continuous control pulse motion of the actuator is stopped when the position of the actuator is past a pulsing range limit, the pulsing range limit being so far from the desired value that the actuator stops before its position is substantially past the desired value. When the actuator has stopped, the position of the actuator is measured and if necessary a corrective run is performed by means of short control pulses of a standard length.

Actuators are used, for example, to control the flow of different media, such as water and steam, in different processes. The actuators control a valve, nozzle or other such element supplying the medium. The actuator can be a motor, cylinder or the like, which can be controlled in many different ways, for example mechanically, electrically, hydraulically or pneumatically.

The actuator is typically run as close to a desired value as possible, after which a verifying measurement is performed. After the verifying measurement, any necessary corrective runs are performed. This kind of control, however, is very inaccurate, and several corrective runs are needed, whereby the control becomes difficult to perform, and the actuator has to be moved back and forth and the clearances further increase the inaccuracy. The above control method is disclosed, for example, in Finnish Patent 85 731. The patent also sets forth the measurement of the clearance, but although the solution of the patent takes the clearance into account, the accuracy and speed of the control are not sufficiently good.

Another known method is to control the actuator to the desired value on a continuous basis, whereby the position of the actuator is measured simultaneously with the control. When the measurement shows that the actuator has reached the desired position, the motion of the actuator is stopped. Because the measurement software is slow, the measurement result, however, is obtained with a delay, whereby the actuator passes the desired value, and to correct the position, corrective runs need to be performed in the opposite direction. The clearances thus make the positioning inaccurate, and the control is complicated and difficult to perform.

German Offenlegungsschrift 41 03 422 teaches a solution in which the actuator is controlled by a continuous control signal when the position of the electropneumatic actuator is farther from the desired value than the certain pre-set limits. When the position of the actuator is closer to the desired value than said limits, the actuator is controlled by control pulses of a standard length and frequency. The length of the control pulses is arranged to be such that the position of the actuator will not pass the clearance i.e.g. a hysteres is produced range by the desired value because of the pulses. The supply of the control pulses to the actuator is continued until the position of the actuator is within the clearance. The solution enhances the accuracy of the positioning, but the actuator, however, is not controlled sufficiently quickly to the correct position in every application, since the motion effected by control pulses is slower than the motion effected by a continuous control signal.

SUMMARY OF THE INVENTION

The object of the present invention is to provide a method in which the above drawbacks are avoided.

The method of the invention is characterized in that an advance is defined such that the advance is closer to the desired value than the pulsing range limit, and the actuator is controlled to the position determined by the advance by the continuous control pulse, and that the advance is defined to be so far from the desired value that the actuator stops before its position is substantially past the desired value.

The essential idea of the invention is that the actuator is controlled on a continuous basis and that the measurement of the position of the actuator is fed back to the control. Another essential idea is to define a pulsing range limit located before the desired value, whereby the motion of the actuator is stopped if the feedback measurement shows that the pulse range limit has been passed. After a verifying measurement, the control of the actuator is continued, if necessary, in the same direction as the previous control. The essential point is that the pulsing range limit is defined so that despite a delay in the software, the actuator will not move past the desired value. The idea of a preferred embodiment is that when the pulsing range limit has been passed, short pulses of a standard length are used to control the actuator. The idea of another preferred embodiment is that a synchronous motor of a standard rate is used to control the actuator, whereby the length of the control pulses defines the length of the motion of the actuator.

The advantage of the invention is that the control is accurate, quick and simple, and the actuator can be controlled to a desired value from one direction, whereby the clearance will not affect the accuracy of the positioning. When short standard-length pulses are used after the pulsing range limit has been passed, the control is simple and accurate. The use of a standard-rate synchronous motor makes the apparatus simple and the control easy.

BRIEF DESCRIPTION OF THE DRAWING

The invention will be described in greater detail in the attached drawing, in which.

Figure 1:
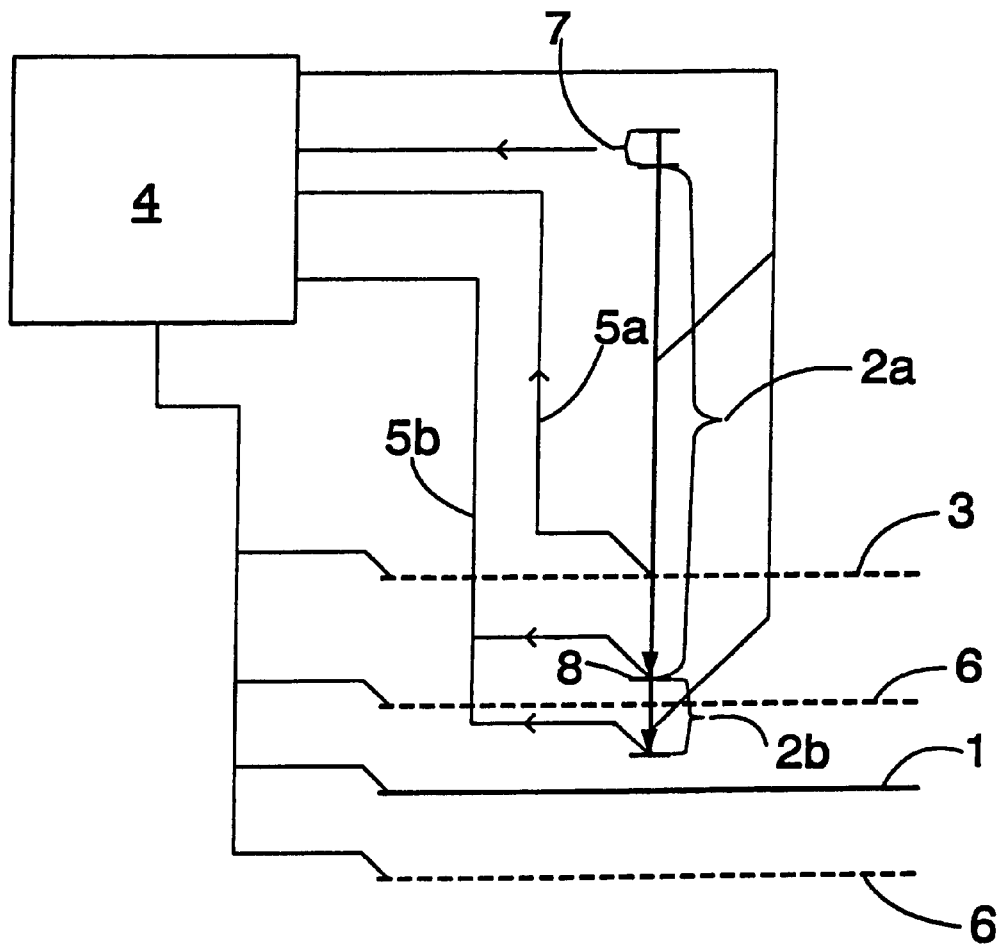
FIG. 1 is a scheme illustrating a control method of the invention.

When the position of the actuator is far from a desired value 1, the actuator is controlled closer to the desired value 1 using a continuous control pulse 2a.

DESCRIPTION OF EXEMPLARY EMBODIMENTS

The method of the invention for positioning the actuator is applicable, for example, to the actuator of a paper machine. The term 'actuator of a paper machine' here means an actuator known per se and used, for example, in a steam box, head box or moisturizer or some other part of a paper or board machine. Controllable profiling equipment, which is usually divided into control sections crosswise of the web, are used to improve the cross profile variables of the paper web. Each valve, nozzle, or other such element that is in the control section of the profiling equipment and affects the variables of paper is controlled by the actuators arranged in the section. Any changes effected by the actuators or elements, for example a motion, force, flow, or the like, have an indirect effect on the cross profile variables of paper, which include basis weight, moisture, thickness and gloss. The motion, force or some other change mentioned above can be effected in the element by the actuators. Particularly preferably, an electromechanical actuator is used in the invention.

The method of the invention for positioning the actuator is particularly useful in the control of the steam supply of a steam box in a paper machine. The amount of steam supplied from the steam box onto the surface of the web is currently adjusted by the pressure of the supplied steam. The pressure is difficult to adjust accurately, and the amount of steam flowing through individual steam nozzles cannot be defined. The pressure is defined with an analogue gauge, which is expensive. The solution of the invention is cheap and very accurate, since the precise position of the steam control shaft is known. The amount of steam is calculated on the basis of pulse data, whereby no separate gauges are needed. The amount of steam is adjusted quickly and accurately by means of the pulse data and the control shaft. The invention thus makes it possible to replace expensive measuring devices, and thereby save money.

The position of the actuator is preferably measured on a continuous basis, and when the position reaches a pulsing range limit 3, feedback data 5a on the passing of the pulsing range limit 3 is transmitted to a control unit 4 of the actuator. The control unit 4 thereby controls the actuator so that the 10 continuous motion of the actuator stops. Because the software of the control unit 4 is slow, the actuator does not stop exactly at the pulsing range limit 3 but continues slightly forward. The actuator is controlled past the pulsing range limit 3 to an advance position 8. When the actuator has stopped, location data 5b on the actuator is supplied to the control unit 4. If the location of the actuator is not sufficiently close to the desired value 1, i.e. is further away from the desired value 1 than the distance indicated by hysteresis, i.e. a clearance range of positions between opposite borderlines hysteresis 6 spaced from the desired position, the actuator is controlled forward by short control pulses 2b of a standard length. Short standard-length control pulses 2b are used in the present invention to control the actuator always when the position of the actuator is closer to the desired value 1 than the pulsing range limit 3. After the standard-length control pulse 2b, the location of the actuator is measured again, and the actuator is controlled by standard-length control pulses 2b until the actuator is closer to the desired value 1 than the distance indicated by the hysteresis, i.e. it is sufficiently close to the desired value 1. The important point is that the pulsing range limit 3 and the advance 8 are sufficiently far from the desired value 1, so that the position of the actuator will not substantially pass the desired value 1, i.e. be further from the desired value 1 than the distance indicated by the hysteresis 6, since the control direction of the actuator would then have to be changed, which in turn would make the control more complicated and the clearances of the actuator would make the control inaccurate. Further, the standard-length control pulses 2b must be defined to be so short that they do not move the actuator too far ahead, i.e. the displacement of the actuator must be smaller than the distance between the hysteresis 6 and the desired value 1. The desired value 1, the pulsing range limit 3, and the hysteresis 6 and advance 8 values are supplied to the control unit 4 specifically for the case. A typical value for the hysteresis 6 is 2 $\mu$m, and for the pulsing range limit 3, 10 $\mu$m.

When the control method of the invention is used, a clearance 7 for the change of direction, which is to be compensated, must be taken into account only at the beginning of the control pulse 2a, if the direction of motion of the actuator has changed by then, since no other change of direction of the actuator takes place when the control of the invention is used.

Figure 2:
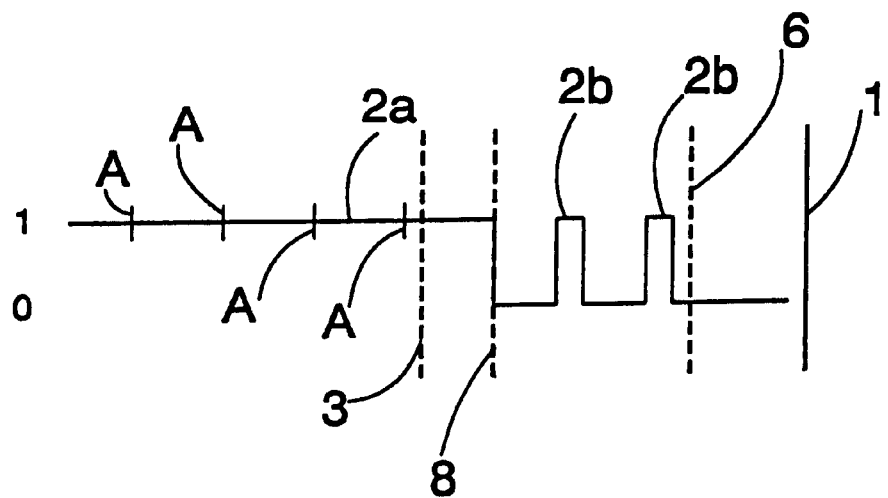
FIG. 2 is a schematic view of a control pulse used.

FIG. 2 is a schematic view of a control pulse used in the method of the invention. When the position of the actuator is further from the desired value 1 than the pulsing range limit 3, the continuous control pulse 2a is used, i.e. the control pulse continuously has binary value '1'. The continuous control pulse 2a is calculated at the moments indicated by lines A, whereby the distance between the calculating instances can be, for example, 500 milliseconds. The control therefore appears to be continuous, although in practice the control pulse is calculated at certain intervals. The continuous control pulse 2a can be defined to end at a distance from the desired value 1 indicated by the advance 8. Since the actuator is controlled quickest to by the continuous control pulse 2a, the advance 8 should be selected to be as short as possible. The advance 8, however, must naturally be sufficient so that the position of the actuator will not substantially pass the desired value 1. When the position of the actuator has passed the advance position 8, the actuator is controlled toward the desired value 1 by short standard-length control pulses 2b. The advance 8 is very easy to select and adjust specifically for the actuator. The pulsing range limit 3 can be the same in all actuators, which means that the pulsing range limit 3 can be defined to be so far from the desired value that no actuator, when controlled by a continuous control pulse, passes the desired value 1. Further, the advance 8 can be changed very quickly and simply. It is thus easy to ensure that, if necessary, the continuous control pulse 2a can continue even considerably past the pulsing range limit 3. This ensures that the actuator can be controlled to its position as quickly as possible in any situation whatsoever.

The actuator is preferably controlled by a standard-rate synchronous motor, whereby the length of the control pulses defines the length of the change of position of the actuator, and the apparatus is simple and the control easy.

The position of the actuator is preferably measured by arranging at least one magnet in conjunction with a shaft of the actuator and at least one Hall sensor in the apparatus: when the shaft rotates, the Hall sensor detects the passing magnet and sends a measuring pulse. The position of the actuator in the linear direction is proportional to the interval between the measuring pulses, whereby the position of the actuator can be defined by the measuring pulses. Such a measuring device is simple and endures well even hard process conditions.

If desired, the intervals of the measuring pulses can also be divided into parts, whereby the position of the actuator can be defined accurately even between the pulses. The divided pulses allow the position of the actuator to be estimated even between the pulses.

The drawing and the associated description are intended only to illustrate the idea of the invention. The invention can vary in its details within the scope of the claims.

What is claimed is:

1. A method of positioning an actuator, the method comprising the steps of:

providing a desired position;

providing a pulsing range limit located before the desired position;

providing an advance position located between the pulsing range limit and the desired position;

determining the position of the actuator and, if the position of the actuator is further from the desired position than the pulsing range limit, providing motion of the actuator toward the advance position by a continuous control pulse and stopping the motion of the actuator;

determining the position of the actuator when the actuator has stopped and, if necessary, performing a corrective run of the actuator toward the desired position by means of short control pulses of a standard length.

2. A method as claimed in claim 1, wherein the motion of the actuator is controlled by a synchronous motor.

3. A method as claimed in claim 2, and further comprising the steps of defining a clearance range boderline spaced from the desired position for the performing of the corrective run when the determined position of the actuator is farther from the desired position than the borderline, and having the standard length of the short control pulses so short that each makes the actuator move a distance that is shorter than the space between the borderline and the desired position.

4. A method as claimed in claim 2, wherein during the continuous control pulse, the position of the actuator is measured on a continuous basis.

5. A method as claimed in claim 3, wherein during the continuous control pulse, the position of the actuator is measured on a continuous basis.

6. A method as claimed in claim 1, wherein during the continuous control pulse, the position of the actuator is measured on a continuous basis.

7. A method as claimed in claim 1, wherein the actuator to be positioned is an actuator of a paper or board machine.

8. A method as claimed in claim 1, and further comprising the steps of defining a clearance range boderline spaced from the desired position for the performing of the corrective run when the determined position of the actuator is farther from the desired position than the borderline, and having the standard length of the short control pulses so short that each makes the actuator move a distance that is shorter than the space between the borderline and the desired position.

9. A method as claimed in claim 8, wherein during the continuous control pulse, the position of the actuator is measured on a continuous basis.

* * * * *